United States Patent [19]

Reed, III

[11] Patent Number: 5,314,308
[45] Date of Patent: May 24, 1994

[54] SYSTEM FOR CONTROLLING HIGHER HARMONIC VIBRATIONS IN HELICOPTER ROTOR BLADES

[75] Inventor: Wilmer H. Reed, III, Hampton, Va.

[73] Assignee: Dynamic Engineering, Inc., Newport News, Va.

[21] Appl. No.: 989,583

[22] Filed: Dec. 11, 1992

[51] Int. Cl.⁵ .............................................. B64C 27/46
[52] U.S. Cl. ................... 416/91; 416/231 B; 416/500; 416/23
[58] Field of Search ..................... 416/4, 23, 24, 90 R, 416/90 A, 91, 231 R, 231 B, 500; 415/914; 244/10, 206

[56] References Cited

U.S. PATENT DOCUMENTS

| | | | |
|---|---|---|---|
| 1,785,333 | 12/1930 | Trey | 416/4 |
| 2,344,515 | 3/1944 | Massey | 416/4 |
| 2,569,983 | 10/1951 | Favre | 416/4 |
| 3,326,296 | 6/1967 | Hill et al. | 415/914 |
| 3,649,132 | 3/1972 | Arcidiacono . | |
| 3,692,259 | 9/1972 | Yuan | 416/90 A |
| 4,040,578 | 8/1977 | Yuan . | |
| 4,236,607 | 12/1980 | Halwes et al. . | |
| 4,514,143 | 4/1985 | Campbell . | |
| 4,655,685 | 4/1987 | Fradenburgh . | |
| 4,809,553 | 3/1989 | Reed, III . | |
| 4,953,098 | 8/1990 | Fischer, Jr. et al. . | |
| 4,965,879 | 10/1990 | Fischer, Jr. . | |
| 5,099,430 | 3/1992 | Hirsch . | |

FOREIGN PATENT DOCUMENTS

| | | | |
|---|---|---|---|
| 3534169 | 3/1987 | Fed. Rep. of Germany | 416/4 |
| 219664 | 10/1925 | United Kingdom | 416/91 |

Primary Examiner—Edward K. Look
Assistant Examiner—James A. Larson
Attorney, Agent, or Firm—Joseph Scafetta, Jr.

[57] ABSTRACT

Higher harmonic control (hereinafter HHC) of helicopter rotor blade vibrations is provided by an actively controlled, rotatable, slotted cylinder which is mounted at an outboard section of each blade. Continuous rotation of each cylinder about its longitudinal axis produces a periodic aerodynamic force on the blade at a frequency of twice the rotational frequency of the cylinder. The amplitude of force is controlled by the size of a slot opening in the cylinder while the rotational speed of the cylinder is synchronized to run at a multiple of the speed of a rotor blade drive shaft. The amplitude and phase of the HHC force is regulated, either manually or by active feedback control, to minimize any vibratory load transmitted to the airframe through the rotor blade drive shaft. A significant advantage offered by this concept relative to other HHC methods, such as high-frequency blade pitch motions actuated either by the swash plate or by moveable tabs at the blade trailing edge, is its low power requirement.

16 Claims, 5 Drawing Sheets

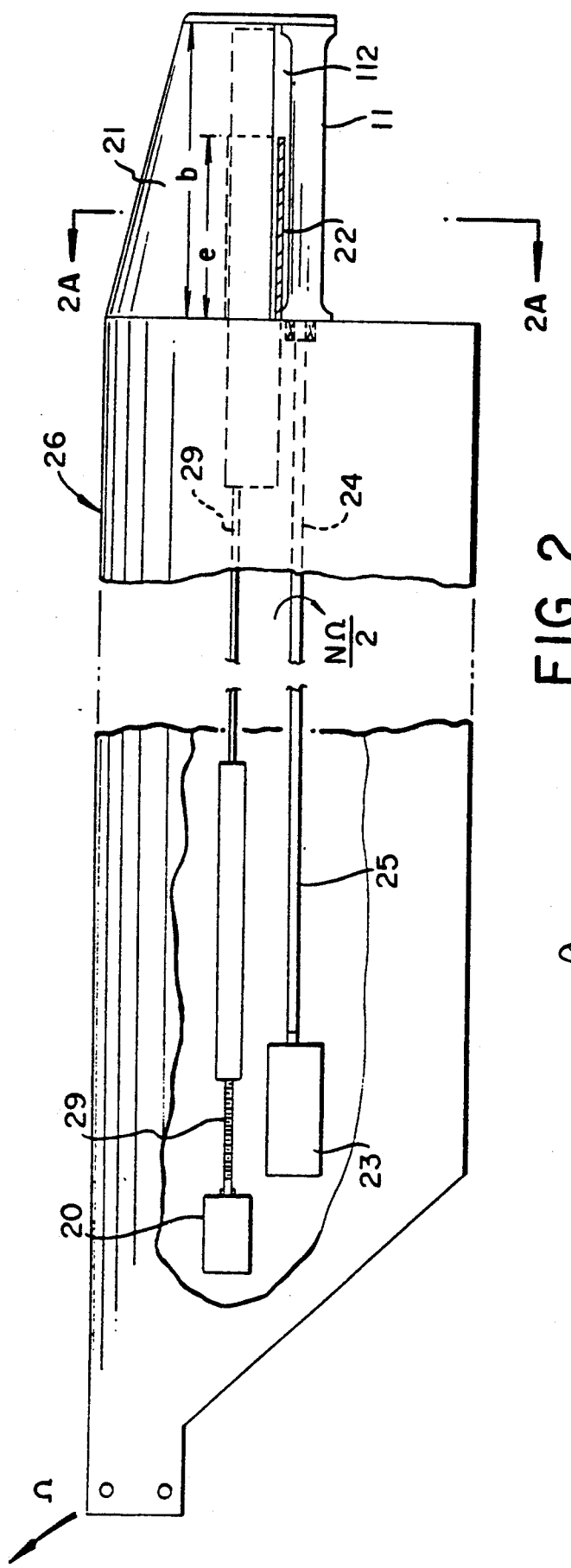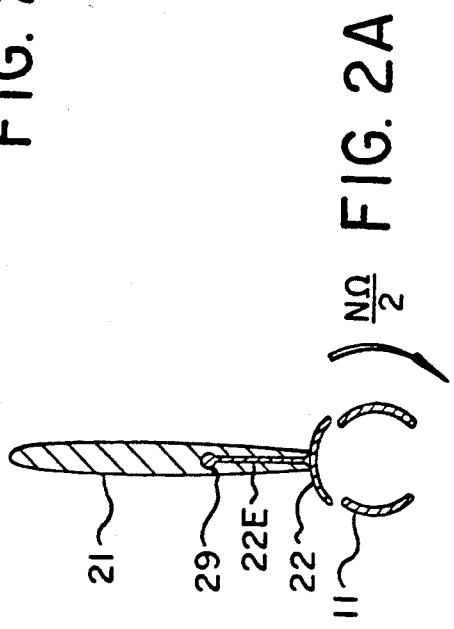
FIG. 2
FIG. 2A

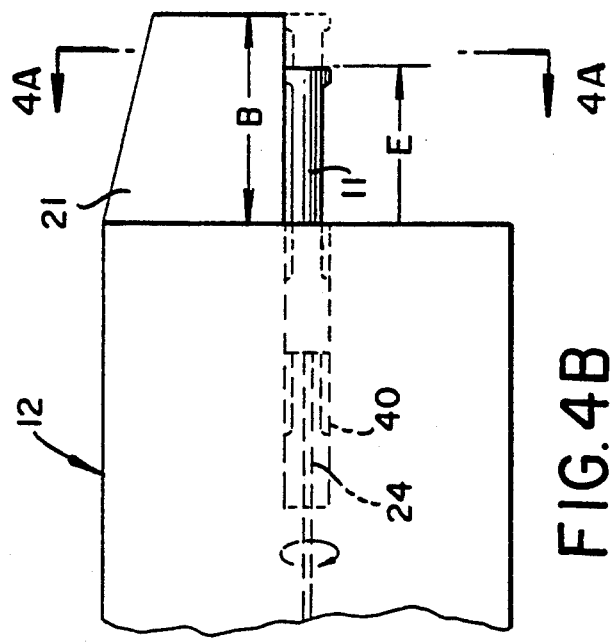
FIG. 4A
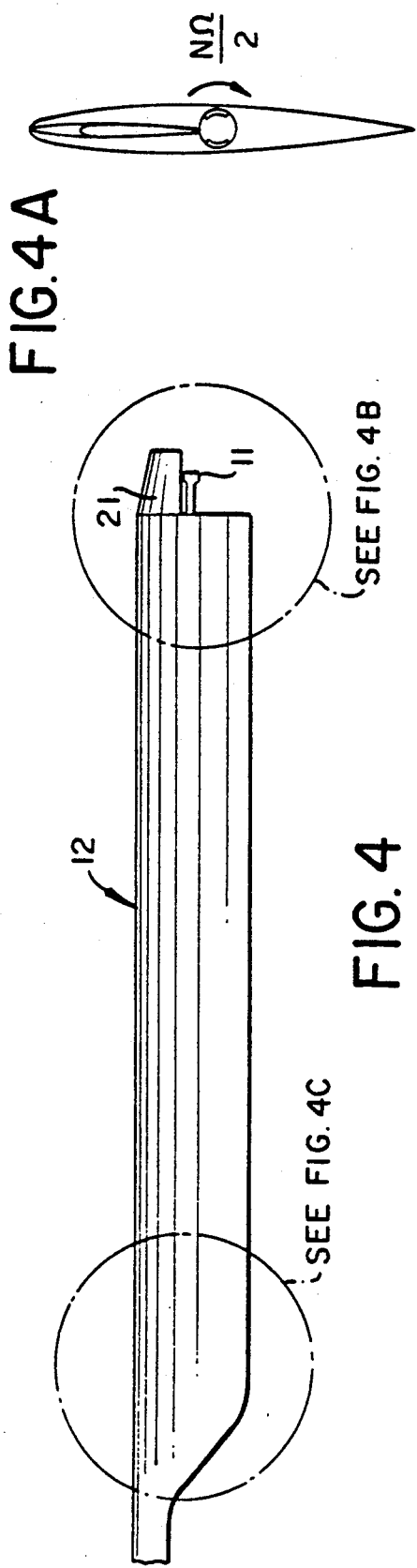
FIG. 4
FIG. 4B
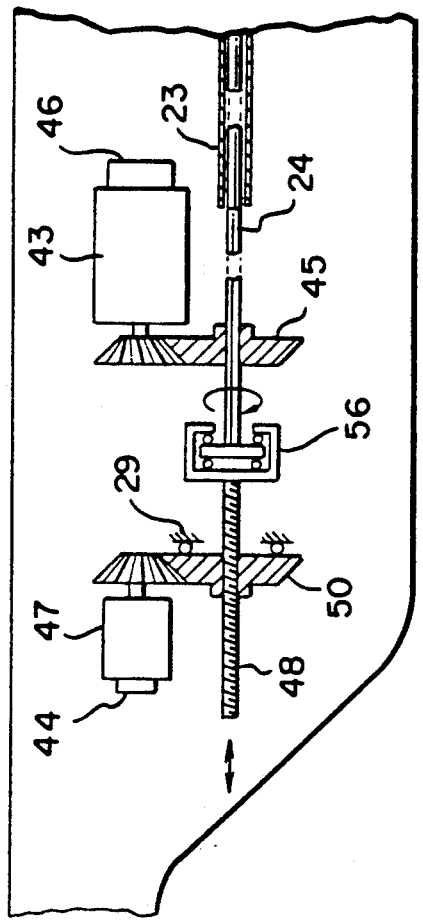
FIG. 4C

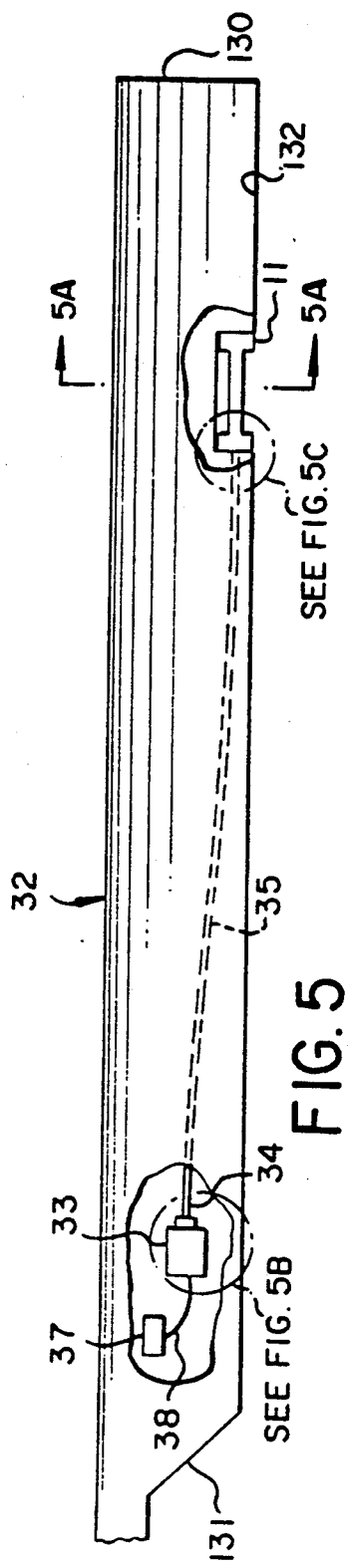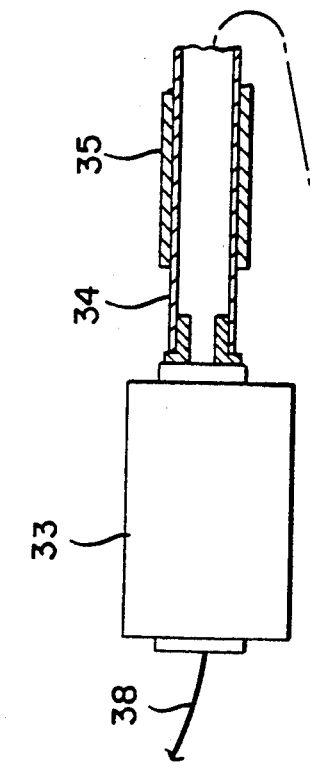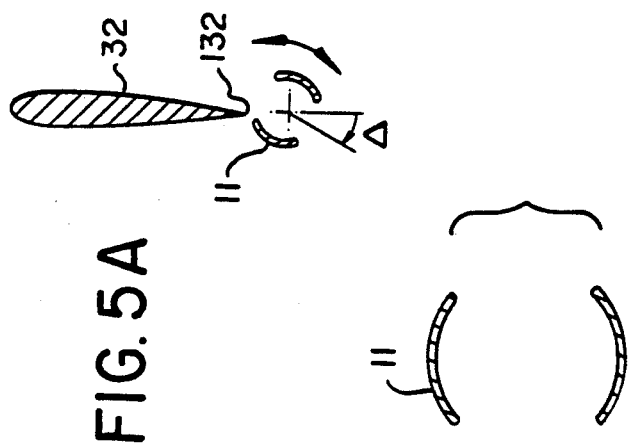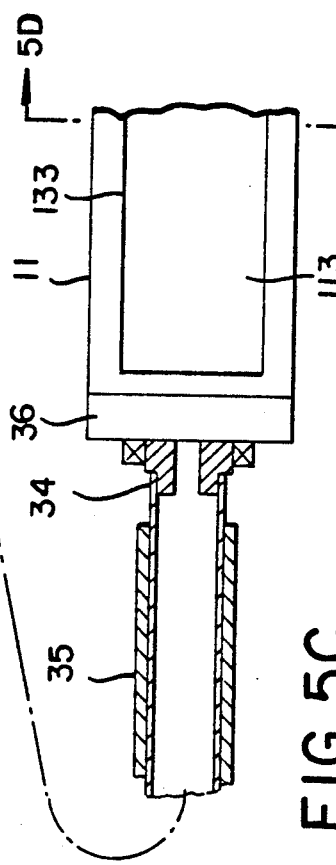
FIG. 5  FIG. 5A  FIG. 5B  FIG. 5C  FIG. 5D

SYSTEM FOR CONTROLLING HIGHER HARMONIC VIBRATIONS IN HELICOPTER ROTOR BLADES

BACKGROUND OF THE INVENTION

1. Field of the Invention.

The present invention relates to helicopters generally and in particular to vibration reduction therein.

2. Description of the Related Art.

The reduction of vibrations is a primary goal in helicopter design. Such vibrations contribute to crew fatigue, passenger discomfort, increased maintenance, and high operating costs. A major cause of such vibrations is periodic aerodynamic loads on the rotor blades.

An effective method of reducing rotor-blade induced vibrations is to control the harmonic airload at the source, i.e. on the rotor blades. For an N-bladed rotor, harmonic loads at (N−1) per revolution, N per revolution and (N+1) per revolution are transmitted to the rotor hub at the frequency rate of N/revolution (hereinafter NP). The function of HHC devices is to generate additional airloads on the rotor so as to cancel the three higher harmonics of blade load causing the NP vibratory hub load. Experience has shown that the NP blade flapping moment is the dominant load as compared with the (N±1)P components.

Various schemes for reducing helicopter vibrations by HHC of airloads on the rotor blade have been investigated and disclosed by others. Some approaches are based on passive vibration control concepts involving dynamically tuned mechanisms which actuate either the swash plate or the tab surfaces on the rotor blade. Other HHC concepts make use of high frequency active control systems which, when coupled with vibration sensors, provide vibration reduction by either manual control or closed loop feedback control.

The most common approach for implementing an HHC system uses broad-frequency band actuators to drive feathering of the rotor blades at high frequencies. The actuators produce the desired blade motions by driving either the swash plate itself or the pitch links between the blade and the swash plate.

Another HHC system involves individual blade control and is commonly known as the IBC system. By the IBC system, the pitch of each rotor blade is controlled independently by a servo actuator responding to feedback control signals from sensors mounted on each rotor blade.

Other HHC systems use either blade servo-flaps or blade circulation control devices to dampen the vibrations.

Typical HHC systems are disclosed by the following:
Arcidiacono in his U.S. Pat. No. 3,649,132 which was issued on Mar. 14, 1972; by Campbell in his U.S. Pat. No. 4,514,143 which was issued on Apr. 30, 1985; by Fradenburgh in his U.S. Pat. No. 4,655,685 which was issued on Apr. 7, 1987; by Fischer, Jr. et al. in their U.S. Pat. No. 4,953,098, which was issued on Aug. 28, 1990; and by Fischer Jr. in his U.S. Pat. No. 4,965,879, which was issued on Oct. 23, 1990.

All of these known prior art devices have one or more of the following disadvantages: first, large amounts of force and power are required for high frequency actuation of blade pitch; second, the service life of blade pitch links is decreased due to increased fatigue; third, debilitating heat is generated by broad band electro-hydraulic actuators; fourth, blade circulation control devices are very complex and expensive to manufacture; and fifth, difficulties arise in tuning passive devices to be effective over a broad range of operating conditions.

Thus, it remains a problem in prior HHC systems to develop a system which requires small amounts of actuator torque and power, has a long service life, does not generate debilitating heat, is simple in design, is relatively inexpensive to manufacture, and avoids the difficulties arising from tuning passive devices.

SUMMARY OF THE INVENTION

It is a primary object of the invention to provide an HHC system that has low power requirements, is light weight, does not generate debilitating heat, is simple in design, is relatively inexpensive to manufacture, and does not require the tuning of any passive devices.

It Is a secondary object of the invention to generate HHC forces by a unique aerodynamic control device mounted directly on the rotor blades of the helicopter.

The present invention may be summarized as an HHC system that includes a rotatable slotted cylinder which is mounted on each rotor blade at a trailing edge of an outboard section of the blade.

Other objects of the invention and distinctive advantages thereof will become evident from the following brief description of the drawings and the subsequent detailed description of the preferred embodiments.

BRIEF DESCRIPTION OF THE DRAWINGS

FIG. 1A shows a cross-sectional view of the first embodiment as seen through line 1A—1A of FIG. 1.

FIG. 1B shows an enlarged view of the left portion of the first embodiment seen in FIG. 1.

FIG. 1C shows an enlarged view of the right portion of the first embodiment seen in FIG. 1.

FIG. 1D shows an end view of the enlarged right portion seen in FIG. 1C.

FIG. 2 shows a top plan view of a second embodiment of the invention in a different helicopter rotor blade.

FIG. 2A shows a cross-sectional view of the second embodiment as seen through line 2A—2A of FIG. 2.

FIG. 4 shows a top plan view of a third embodiment of the invention in a helicopter rotor blade.

FIG. 4A shows a cross-sectional view of the third embodiment as seen through line 4A—4A of FIG. 4B.

FIG. 4B shows an enlarged view of the right portion of the third embodiment seen in FIG. 4.

FIG. 4C shows an enlarged view of the left portion of the third embodiment seen in FIG. 4.

FIG. 5 shows a cross-sectional view of the fourth embodiment of the invention in a helicopter rotor blade.

FIG. 5A shows a cross-sectional view of the fourth embodiment as seen through line 5A—5A of FIG. 5.

FIG. 5B shows an enlarged view of the left portion of the fourth embodiment seen in FIG. 5.

FIG. 5C shows an enlarged view of the right portion of the fourth embodiment seen in FIG. 5.

FIG. 5D shows an end view of the enlarged right portion seen in FIG. 5C.

DETAILED DESCRIPTION OF THE PREFERRED EMBODIMENTS

Figure 1:
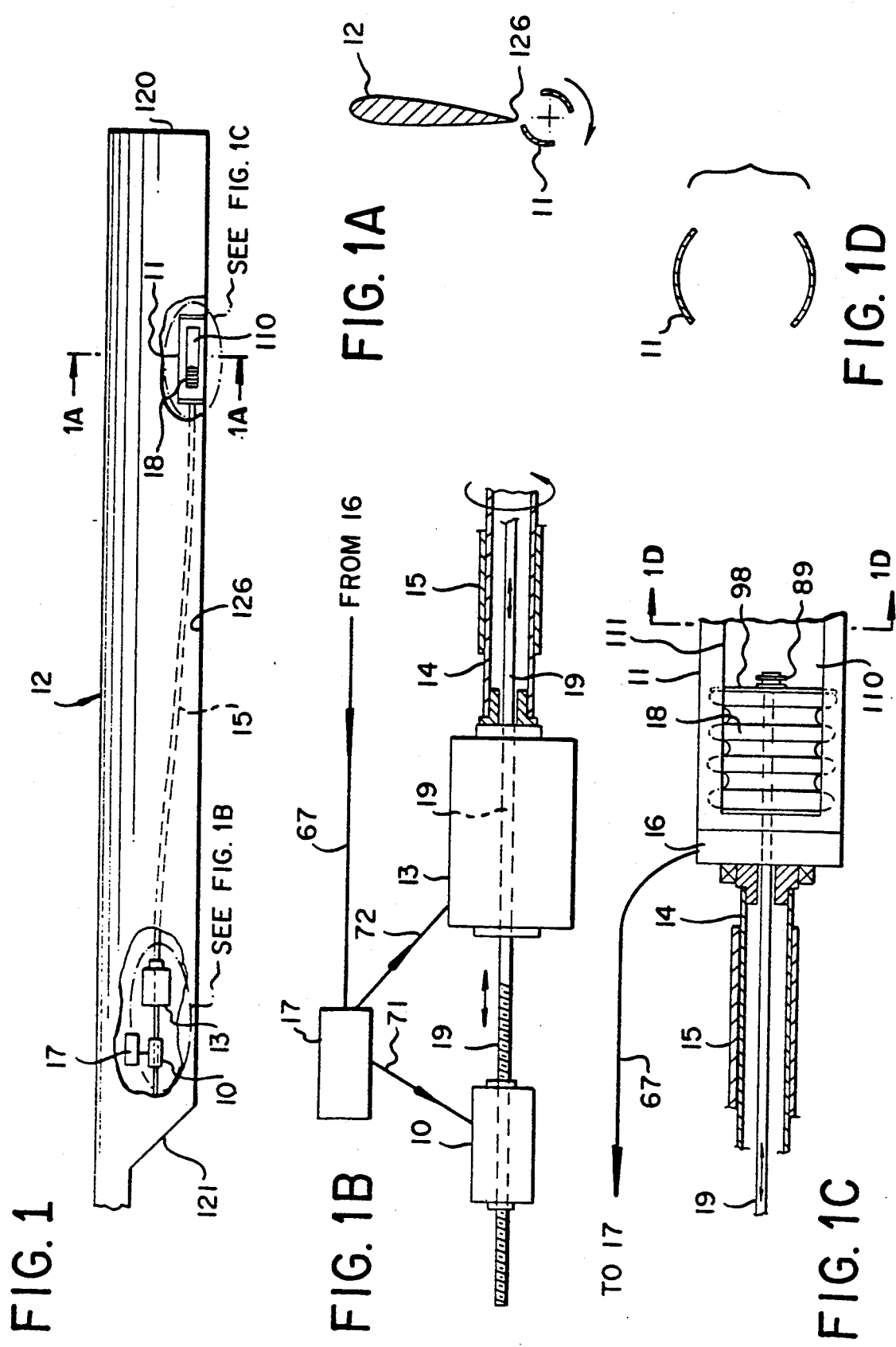
FIG. 1 shows a top plan view of a first embodiment of the invention in a helicopter rotor blade. 109

A first embodiment of the invention in a helicopter rotor blade 12 is illustrated in FIG. 1. In this first embodiment, a rotating slotted cylinder 11 is shown in FIGS. 1C and 1D.

As best seen schematically in FIG. 1A, the cylinder 11 is mounted at the trailing edge 126 of the blade 12. As shown only in FIG. 1, the mounting of the cylinder 11 occurs near a tip on an outboard section 120 of the blade 12.

Referring now to FIGS. 1B and 1C, it can be seen that the cylinder 11 rotates about its longitudinal axis such that the airstream passes through spanwise slots 111 that are symmetrically aligned on diametrically opposite sides of the cylinder 11. Rotation of the cylinder 11 results in an oscillating downwash producing a near-sinusoidal lift force at a frequency twice that of the cylinder rotation frequency. The amplitude of dynamic lift is proportional to dynamic pressure of the airstream and the length of an opening 110 in the slot 111.

The lift force produced by the rotating cylinder 11 is analogous to that developed by an oscillating trailing edge control surface, but the input power required is substantially less for two reasons: first, since the cylinder 11 rotates at a constant or slowly varying speed, the inertia forces associated with a control surface oscillating at high frequencies are not present; and second, there is the absence of aerodynamic hinge moments associated with the deflection of conventional control surfaces. Because of the circular cross-section of the cylinder 11, pressures on its surface act radially, thus producing no torque about the rotation axis. Consequently, the input torque required for cylinder rotation is only that needed to overcome the relatively small mechanical and aerodynamic friction forces.

The rotational speed and the angular position of the cylinder 11 is sensed by a nonrotating transducer 16 and is fed back by a cable 67 to a control unit 17 which may be a digital motion controller. The control unit 17 is mounted either in the rotor blade 12, as shown in FIG. 1, or in a nonrotating section of the helicopter. Input control commands are transmitted from the helicopter fuselage to the rotating blade 12 either through slip rings or by other means (not shown).

Output signals from the control unit 17 are transmitted through cable 71 to a linear actuator 10 and through cable 72 to a servo motor 13. The amplitude of the HHC force is controlled by the linear actuator 10; the frequency and phase angle is controlled by the direct current (DC) servo motor 13. Both units 10 and 13 are mounted near to a root on an inboard section 121 of the blade 12.

Still referring to both FIGS. 1B and 1C, it may be seen that the motor 13 of FIG. 1B is connected to the cylinder 11 of FIG. 1C by a long, flexible, rotating, inner torque tube 14. This tube 14 and a long, flexible, nonrotating, outer sheath 15 are housed within the body of the blade 12. Note that the outer sheath 15, shown in FIG. 1 in phantom lines inside the body of the blade 12, guides and protects the torque tube 14 against damage.

As seen in FIG. 1C, the linear actuator 10, which controls the HHC force amplitude, either pushes or pulls at one end a nonrotating rod 19 through central portions of the motor 13 and the tube 14. The rod 19 at its opposite end is secured to an end cap 89, seen only in FIG. 1C, by a thrust bearing 98 that allows a bellows 18 to rotate with the cylinder 11.

It is important to note that, as seen in FIG. 1C, the amplitude of dynamic force produced by the cylinder 11 is changed by either extending or retracting the bellows 18, thus either reducing or increasing the opening 110 in the slot 111 of the cylinder 11. Changes in the size of the opening 110 in the slot 111 are necessary only during either helicopter maneuvers or when steady-state flight conditions change Such changes in the slot opening 110 would be made at a slow rate relative to the rotational speed rate of the blade 12.

Also, electrical power for the actuator 10 and the motor 13 may be provided by either batteries (not shown) or other conventional low power sources.

The operation of the invention will now be described with reference to the first embodiment illustrated in FIGS. 1-1D. The actuator 10 and the motor 13 are positioned inside the rotating blade 12. It is necessary to sense vibrations and to generate the required amplitude and phase-compensating forces on the blade 12 at multiple frequencies, namely NP and (N±1)P. The relative contribution of each of these frequencies to the resultant NP vibratory load at the nonrotating hub (not shown) of the helicopter depends upon the proximity of the natural frequencies of the blade 12 to the NP and (N±1)P frequencies. Generally, the NP blade frequency will be the dominate contributor to helicopter vibrations.

Because the rotating cylinder 11 produces two cycles of force during each rotation, it is critical that the rotational speed of the cylinder 11 be synchronized to run at one-half of the dominate harmonic frequency. Less significant harmonic vibrations are controlled by periodically varying the rotational speed of the cylinder 11 so as to produce other counteracting harmonic frequencies at required amplitudes and phase angles.

A second embodiment of the invention is illustrated in FIG. 2. As best shown schematically in FIG. 2A, the rotating slotted cylinder 11 is installed at a tip 21 on an outboard section of a second rotor blade 26. As shown in FIG. 2, a retractable, nonrotating, rigid shroud 22 has an extension 22E which is housed in a cavity within the tip 21 of the blade 26 and is either pushed or pulled by a rod 29 actuated by a linear actuator 20. The retractable shroud 22 is aligned coaxially adjacent to the cylinder 11 and functions analogously to the retractable bellows 18 in the first embodiment illustrated in FIGS. 1-1D. As in the case of the first embodiment, the second embodiment shown in FIG. 2 has a servo motor 23 which rotates a flexible torque tube 24 inside an outer nonrotating sheath 25. The tube 24 turns the cylinder 11 at a frequency of $N\Omega/2$ where $\Omega$ is the rotational frequency of the blade 26 about the hub (not shown).

Note that the length of the cylinder 11 in FIG. 2 is fixed at a distance of "b" inches while the shroud 22 is adjustable to cover a selected distance of "e" inches, depending upon a size of "b−e" inches desired for an opening 112 through a slot in the cylinder 11.

Figure 3A:
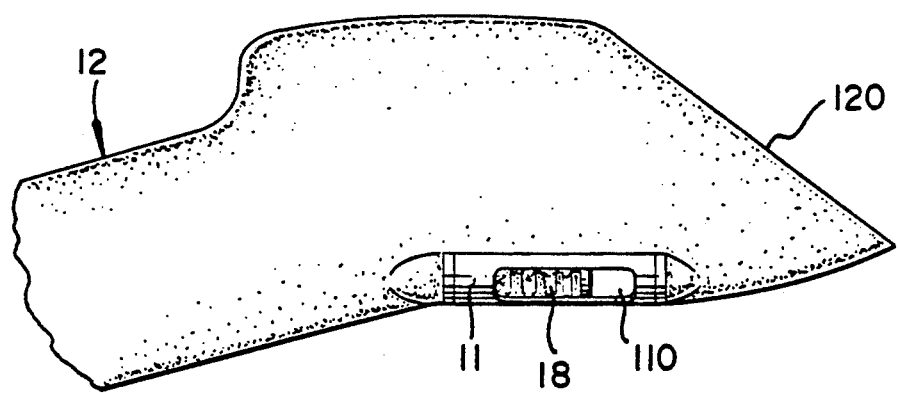
FIG. 3A shows a perspective view of the installation of the first embodiment in a high-performance tip on a helicopter rotor blade.

In FIG. 3A, the first embodiment is installed in a high-performance tip on the outboard section 120 of the blade 12. The mutually rotating cylinder 11 and bellows 18 are shown on the trailing edge of the blade 12. The opening 110 in the cylinder 11 beyond the bellows 18 is also visible In FIG. 3B, the second embodiment is installed in the conventional tip 21 on the outboard section of the blade 26. The rotating cylinder 11 and the nonrotating shroud 22 are shown on the trailing edge of the blade 26. The opening 112 in the cylinder 11 beyond the shroud 22 is likewise visible.

A third embodiment of the invention in the helicopter rotor blade 12 is illustrated in FIG. 4 which shows schematically the rotating slotted cylinder 11 and the fixed vane 21 installed at the tip of the rotor blade 12. The fixed vane 21 extends a distance "B" beyond the tip of the rotor blade 12. In this third embodiment, the rotating cylinder 11 is retractable into a cavity 40 within the rotor blade 12, as indicated in the enlarged view of the rotor blade tip 21 seen in FIG. 4B. The HHC force produced by the cylinder 11 on the blade 12 is proportional to an exposed length E of the cylinder 11. The exposed length E is analogous to the length of the opening 110 in the slot 111 exposed by the retractable bellows 18 in FIG. 1C and to the opening 112 of "b−e" inches exposed by the retractable shroud 22 in FIG. 2.

As in the case of the first and second embodiments, the cylinder rotation is driven by a flexible rotating drive shaft 24 which is housed within a nonrotating outer sheath 27, as seen in FIG. 4C. Referring to FIG. 4B, the drive shaft 24 controls the rotation speed $N\Omega/2$ seen in FIG. 4A, the phase of the cylinder 11, and the exposed length E. Referring to FIG. 4C, rotation of the drive shaft 24 is controlled by a servo motor 43 and a sensor 46 through a drive gear 45. The inboard section of the shaft 24 transitions from a circular to a square cross-section and passes through a mating square hole in the hub of the gear 45, thereby allowing axial sliding motions to occur between gear 45 and the shaft 24. The exposed length E of the cylinder 11 is controlled by motor 47 and another sensor 44 through a gear 50 which is threaded onto a nonrotating shaft 48. Rotation of the gear 50 causes the threaded shaft 48 to translate either left or right, as shown by a double-headed arrow at the far left in FIG. 4C, depending upon the direction of rotation of the motor 47. The linear motion of the nonrotating threaded shaft 48 is transmitted to the rotating torque shaft 24 through a thrust bearing coupling 56. The tension force in the cylinder drive shaft 24 due to centrifugal force is reacted by thrust bearings 29 located between an internal wall of the rotor blade 12 and the face of the gear 50.

A fourth embodiment of the invention in a rotor blade 32 is illustrated in FIG. 5. In this fourth embodiment, a slotted cylinder 11 is best shown in FIGS. 5C and 5D.

As shown schematically in FIG. 5A, the cylinder 11 is mounted at a trailing edge 132 of the blade 32. As seen only in FIG. 5, the mounting of the cylinder 11 occurs near a tip on an outboard section 130 of the blade 32.

Referring now to FIG. 5B, it should be noted that a DC servo motor 33 does not rotate the cylinder 11 continuously in one direction as in the second and third embodiments. Instead, its rotation is limited to a maximum angle $\Delta$ of $\pm 45°$. The motor 33 drives a long, flexible, inner torque tube 34 inside a long, flexible, nonrotating, outer sheath 35. As seen in FIG. 5, the motor 33, the tube 34, and the sheath 35 (seen in phantom lines) are mounted near to a root on an inboard section 131 of the blade 32.

Referring now to both FIGS. 5B and 5C, the motor 33 of FIG. 5B is connected to the cylinder 11 of FIG. 5C by the torque tube 34. As seen in FIG. 5A, the cylinder 11 is oscillated back and forth through a selected rotational angle $\Delta$ from its undeflected position in which an opening 113 in a slot 133 of the cylinder 11 is aligned with a free stream of air passing around the blade 32 and through the opening 113.

As seen in FIG. 5C, both the rotational position and the angular velocity of the cylinder 11 are sensed by a nonrotating transducer 36. Information sensed by the transducer 36 is transmitted, as seen in FIG. 5, to a digital motion control unit 37 which sends a signal via an electric line 38 to the motor 33. The motor 33, in turn, drives the cylinder 11 through the torque tube 34 at the frequency, deflection angle, and phase required to minimize vibration of the rotor hub (not shown).

The following comparison of the four embodiments should be helpful to the reader in understanding the operational distinctions of each system.

Note that, although the mechanization of the three embodiments shown in FIGS. 1 through 4 differ, the HHC functions are the same in each case, i.e. the frequency and phase of the control force is determined by the rotational speed and angular position of the cylinder 11 while the force amplitude is controlled by the length of a cylinder slot exposed to atmospheric air flow. The retractable rotating bellows 18 of the first embodiment (FIGS. 1 and 3A) serves the same function as the retractable nonrotating shroud 22 of the second embodiment (FIGS. 2, 2A, and 3B), and the retractable rotating cylinder 11 of the third embodiment (FIGS. 4–4C).

For a given flight condition, the slot opening (110 in FIG. 1, 112 in FIG. 2, and E in FIG. 4B) is adjusted, either manually by the operator or automatically by an active feedback control algorithm, to give maximum vibration reduction. In other words, either the bellows 18 in FIG. 1, the shroud 22 in FIG. 2, or the exposed length E in FIG. 4B is moved into the desired position for the given flight condition. During maneuvers or changes in a steady flight condition, the slot opening (110, 112 and E) is adjusted as required to minimize vibration.

In the fourth embodiment shown in FIGS. 5–5D, the slotted cylinder 11 likewise functions as an HHC device. However, instead of rotating as in the first and second embodiments, the cylinder 11 of the fourth embodiment oscillates through angular deflections $\Delta$ up to $\pm 45°$ relative to a "mean" position in which the slot opening 113 in FIG. 5C is aligned with the free air stream flow about the blade 32 and through the cylinder 11.

Figure 3B:
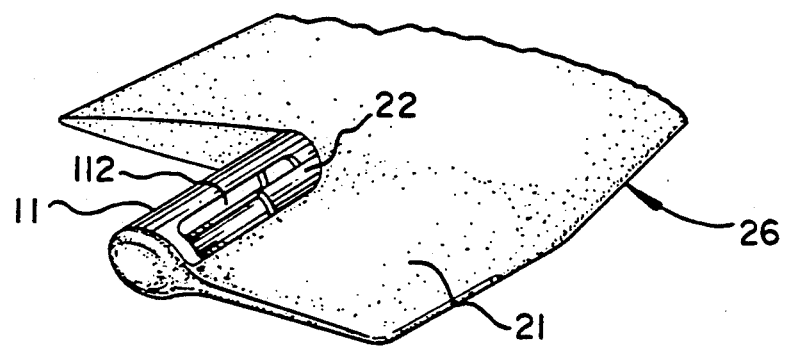
FIG. 3B shows a perspective view of the installation of the second embodiment in a conventional tip on a helicopter rotor blade.

Thus, in this fourth embodiment with an oscillating cylinder 11, there is no need for a slot closure mechanism, such as the bellows 18 in FIG. 3A or the shroud 22 in FIG. 3B, or the exposed length E in FIG. 4B, which is necessary with the rotating cylinders 11 of the first, second, and third embodiments, respectively.

In the first, second, and third embodiments, since the servo motor rotates at a nearly constant speed, the torque and power requirements are minimal. However, for the fourth embodiment, in which the cylinder 11 oscillates at HHC frequencies, greater torque capabilities are required in the servo drive system (i.e. elements 33, 34 and 35 in FIG. 5B) in order to overcome inertia effects at high frequencies. Nevertheless, in all four embodiments, the aerodynamic moment about the rotation axis of the cylinder 11 is essentially zero due to its circular cross-section.

In conclusion, the features believed to be new in the first, second, and third embodiments include a blade-mounted HHC system having a rotating slotted cylinder 11 by which vibrations at higher harmonic frequencies are controlled.

The rotational speed of the cylinder 11 is synchronized to one-half the frequency of the dominate blade excitation force (usually NP). The amplitude and phase of the HHC force is regulated, either manually by an operator or automatically by an active control algorithm, to minimize vibrations in the helicopter rotor blades.

The amplitude of the control force, which is proportional to the size of the slot opening, is controlled by linearly moving a closure mechanism (bellows 18 in FIG. 1; shroud 22 in FIG. 2, and exposed length E in FIG. 4).

The features believed to be new in the fourth embodiment in FIG. 5A include the blade-mounted slotted cylinder 11 which oscillates at controlled amplitudes and phase angles at higher harmonic frequencies. Because of the low input power required, the cylinder 32 in FIG. 5 can be driven by a small electric servo motor 33 mounted within the contour of the rotor blade 32 and connected to the cylinder 11 by a flexible shaft 34.

The foregoing four preferred embodiments are considered illustrative only. Numerous other modifications will readily occur to those persons skilled in aeronautical technology after reading the foregoing specification. Consequently, the exact construction and operation shown and described above is not limited thereto but rather is defined by the following claims.

I claim:

1. A device for reducing vibrations caused by higher harmonic frequencies generated in a helicopter rotor blade during flight, comprising:
    a rotatable cylinder means, mounted on the blade, for imparting counteracting higher harmonic frequencies to the blade so as to control the vibrations, said rotatable cylinder means having slotted means for allowing air to pass therethrough;
    wherein said rotatable cylinder means having the slotted means provides a harmonically varying force with controllable magnitude and phase.

2. The device, according to claim 1, further comprising:
    a retractable and extendible means, mounted cooperatively with the cylinder means, for adjusting a size of an opening in the slotted means through which the air is allowed to pass.

3. The device, according to claim 2, wherein:
    said retractable and extendible adjusting means is a bellow means, secured inside the cylinder means, for rotating with the cylinder means.

4. The device, according to claim 2, wherein:
    said retractable and extendible adjusting means is a shroud aligned coaxially adjacent to the cylinder means.

5. The device, according to claim 2, wherein:
    said retractable and extendible adjusting means is housed in a cavity in the rotor blade.

6. The device, according to claim 1, wherein:
    said cylinder means is mounted at a trailing edge of the blade.

7. The device, according to claim 1, further comprising:
    transducer means, mounted adjacent to the cylinder means, for sensing rotational position and angular velocity of the cylinder means and for transmitting informational data.

8. The device, according to claim 7, further comprising:
    motion control means, mounted in communication with the transducer means, for receiving the informational data from the transducer means and for sending a signal.

9. The device, according to claim 8, further comprising:
    a retractable and extendible means, mounted cooperatively with the cylinder means, for adjusting a size of an opening in the slotted means through which the air is alloued to pass; and
    actuator means, mounted in communication with the motion control means, for receiving the signal and for causing movement of the retractable and extendible adjusting means a selected linear distance in response to the signal.

10. The device, according to claim 9, further comprising:
    means, connected between the actuator means and the adjusting means, for moving the adjusting means the selected linear distance.

11. The device, according to claim 10, wherein:
    said moving means is a push-pull rod.

12. The device, according to claim 1, further comprising: motor means, mounted in communication with the cylinder means, for causing rotation of the cylinder means.

13. The device, according to claim 12, further comprising:
    means, connected between the motor means and the cylinder means, for rotating the cylinder means.

14. The device, according to claim 13, wherein:
    said rotating means is one of a flexible torque tube and a shaft.

15. The device, according to claim 12, further comprising:
    sheath means, wrapped around a flexible torque tube driven by the motor means, for guiding and protecting the torque tube against damage.

16. A device for reducing vibrations caused by higher harmonic frequencies generated in a helicopter rotor blade during flight, comprising:
    an oscillatable cylinder means, mounted on the blade, for imparting counteracting higher harmonic frequencies to the blade so as to control the vibrations, said oscillatable cylinder means having slotted means for allowing air to pass therethrough;
    wherein said cylinder means oscillates through a controllable rotatinal angle with up to ±45° maximum deflection from its undeflected position.

* * * * *

UNITED STATES PATENT AND TRADEMARK OFFICE
CERTIFICATE OF CORRECTION

PATENT NO. : 5,314,308
DATED : May 24, 1994
INVENTOR(S) : Reed, III

It is certified that error appears in the above-identified patent and that said Letters Patent is hereby corrected as shown below:

In FIG. 4C of the drawings, reference numeral "23" should be --27--.

In Col. 2, line 19, change "Is" to --is--;
line 33, delete "109"; and
line 61, change "the" to --a--.

In Col. 3, line 65, change "1C" to --1B--.

In Col. 4, line 11, after "change", insert --.--;
line 43, change "2" to --2A--; and
line 66, after "visible", insert --.--.

In Col. 5, line 68, change "position in" to --position. In--.

UNITED STATES PATENT AND TRADEMARK OFFICE
CERTIFICATE OF CORRECTION

PATENT NO. : 5,314,308
DATED : May 24, 1994
INVENTOR(S) : Reed, III

It is certified that error appears in the above—identified patent and that said Letters Patent is hereby corrected as shown below:

In Col. 6, line 1, change "which" to --FIG. 5C,--;

line 19, change "is" to --are--; and line 51, after "3A", insert --,--.

In Col. 7, line 13, change ";" to --,--; and line 19, change "32" to --11--.

In Col. 8, line 20, claim 9, correct the spelling of "allowed"; and line 58, claim 16, correct the spelling of "rotational".

Signed and Sealed this

Thirteenth Day of September, 1994

Attest:

BRUCE LEHMAN

Attesting Officer

Commissioner of Patents and Trademarks